United States Patent
Yamauchi et al.

(10) Patent No.: US 7,616,324 B2
(45) Date of Patent: Nov. 10, 2009

(54) ULTRA PRECISION PROFILE MEASURING METHOD

(75) Inventors: Kazuto Yamauchi, 8-8, Senriokanaka, Suita-shi, Osaka 565-0812 (JP); Hidekazu Mimura, Takatsuki (JP)

(73) Assignees: JTEC Corporation, Kobe-shi (JP); Kazuto Yamauchi, Suita-shi (JP)

( * ) Notice: Subject to any disclaimer, the term of this patent is extended or adjusted under 35 U.S.C. 154(b) by 64 days.

(21) Appl. No.: 11/992,096

(22) PCT Filed: Feb. 15, 2007

(86) PCT No.: PCT/JP2007/052729

§ 371 (c)(1), (2), (4) Date: Mar. 14, 2008

(87) PCT Pub. No.: WO2007/097244

PCT Pub. Date: Aug. 30, 2007

(65) Prior Publication Data

US 2009/0135431 A1    May 28, 2009

(30) Foreign Application Priority Data

Feb. 20, 2006    (JP) .............................. 2006-042547

(51) Int. Cl.
  *G01B 11/02*    (2006.01)

(52) U.S. Cl. .................................................... 356/511

(58) Field of Classification Search .......... 356/510–515
See application file for complete search history.

(56) References Cited

U.S. PATENT DOCUMENTS 6,185,315 B1 * 2/2001 Schmucker et al. ......... 382/108

(Continued)

FOREIGN PATENT DOCUMENTS

JP    63-243708    10/1988

(Continued)

OTHER PUBLICATIONS

Patent Abstracts of Japan, Publication No. 04-290907 dated Oct. 15, 1992/Abstract.

*Primary Examiner*—Tarifur Chowdhury
*Assistant Examiner*—Jonathan M Hansen
(74) *Attorney, Agent, or Firm*—Kratz, Quintos & Hanson, LLP (57) ABSTRACT

To provide a method for measuring a plane mirror or a curved surface mirror close to plane mirror for condensing hard X-rays or soft X-rays used in a radiation light facility, especially an elliptical or tubular object having a steep profile exceeding $1 \times 10^{-4}$ rad, ultra precisely with a precision on nano order or sub-nano order. Overall profile is measured by using overall profile data obtained from a Fizeau interferometer and stitching a plurality of micromeasurement data from a Michelson microinterferometer. A curved surface measured and a reference plane are measured simultaneously by the Fizeau interferometer, a plurality of pieces of partial profile data in a region narrower than the curved surface measured are acquired simultaneously by inclining the curved surface measured and the reference plane simultaneously and sequentially with respect to a reference plane, relative angle between the pieces of partial profile data is measured as the inclination angle of the reference plane, and adjoining pieces of partial profile data are stitched by utilizing coincidence between the inclination angle and an overlapped region thus obtaining overall profile data.

6 Claims, 7 Drawing Sheets

U.S. PATENT DOCUMENTS

2006/0285123 A1 * 12/2006 Evans et al. .................. 356/511

FOREIGN PATENT DOCUMENTS

| | | |
|---|---|---|
| JP | 2-259509 | 10/1990 |
| JP | 7-91933 | 4/1995 |
| JP | 10-160428 | 6/1998 |

* cited by examiner

ULTRA PRECISION PROFILE MEASURING METHOD

TECHNICAL FIELD

The present invention relates to an ultra-precision profile measuring method, and more particularly to an ultra-precision profile measuring method that enables to measure, with ultra precision, a plane mirror or a spherical/aspherical mirror analogous to the plane mirror in shape to condense hard X-rays or soft X-rays to be used in e.g. a radiation facility.

BACKGROUND ART

As a method for measuring a profile of a mirror with precision in the order of nanometer, there are generally used a method (Long Trace Profiler) for obtaining profile data by measuring normal vectors to a mirror surface at a predetermined interval and integrating the measurement data, and a method using an interferometer. The former method (see patent document 1) for measuring normal vectors comprises: measuring normal vectors at multitude points on a surface of a measurement object; calculating tilt angles of the respective measurement points with respect to a reference line; and interpolating data between the adjoining measurement points to obtain a profile of the measurement object. In the above method, it is necessary to reduce the interval between the measurement points in order to measure the profile of the measurement object with high precision. Accordingly, a large number of measurement points is required to measure a profile of a measurement object having a large area, which may increase a time required for measurement. In the latter method (see patent document 2) using an interferometer, the size of a measurement aperture is limited. Accordingly, in the case where a profile of a measurement object having a larger size than the size of the measurement aperture is to be measured, there is used a method comprising: measuring individual areas in a manner that the adjoining measurement areas are overlapped with use of an XY-stage as a mirror stage; and after the measurement is terminated, stitching pieces of data in such a manner an overlapping error on the overlapping area is minimized to obtain the overall profile of the measurement object.

In the method using the overlapping area, precision on measurement data is determined by angle accuracy at the time of stitching. In performing measurement using an interferometer, measurement with precision as high as the order of nanometer or higher is possible, if the measurement is performed in a null fringe condition. A flat reference surface capable of measuring a profile of a measurement object with precision as high as 1 nm order or less is used as a reference plane in the measurement using an interferometer by performing a three-plane matching method or a like method in advance. However, in the case where a profile of a measurement object is not measurable in a null fringe condition, a measurement error corresponding to a fringe may be generated in the measurement data. The measurement error may make it impossible to accurately calculate stitching angles between the adjoining pieces of data at the time of stitching. Since the error is integrated each time the stitching is performed, the measurement error may greatly affect the process of acquiring the overall profile of the measurement object.

In view of the above, in the case where stitching measurement using an interferometer is performed, it is required to obtain accurate stitching angles. In view of the above, patent document 3 discloses a method comprising: measuring angles of a mirror in different postures with high precision separately at the time of measuring pieces of data; and stitching the pieces of data by using the posture angles of the mirror. In the case where stitching measurement is performed, it is required to maintain positional relations between a reference plane of the interferometer and a sample stage. Accordingly, in the method of patent document 3, stability of ambient temperature and measurement precision on angles are the keys to secure profile precision. The measurement method recited in patent document 3 is suitable as a method for measuring a surface profile of a measurement object having a large area such as a glass substrate to be used in a liquid crystal display panel in the order of sub micron, but is not suitable as a method for measuring a profile of a measurement object with ultra precision corresponding to nano order or sub-nano order. The absolute precision of a linear encoder currently available on the market with a highest precision is at most about $5\times10^{-8}$ rad. There is a demand for a method for obtaining stitching angles with higher precision in the order of nanometer to attain precision with respect to the entirety of measurement data.

The inventors of the present application have proposed a system, in non-patent document 1, for measuring a profile of an X-ray mirror in the entirety of a space wavelength region with high precision and measurement reproducibility of 1 nm order or less in PV (peak-to-valley) value. The measurement principle of non-patent document 1 is based on profile measurement by stitching with use of a Michelson microscopic interferometer having a possibility of high space resolution, and is directed to correct stitching errors by using data from a Fizeau interferometer capable of high precision measurement in a space wavelength region corresponding to an intermediate/long cycle. In the stitching, tilts between adjoining pieces of measurement data are optimally corrected by utilizing a matching degree on overlapping areas which are measured in common with respect to the pieces of profile measurement data on the adjoining areas. In performing the stitching, even if there is a profile error as small as 0.1 nm order, which may be generated from a slight profile error on the reference plane, a focus distance difference, or a like factor, an error in a long cycle component may be generated in the overall profile data obtained after the stitching. In view of the above, in the measurement system recited in non-patent document 1, an error in focus distance of the Michelson microscopic interferometer is suppressed to 0.3 μm or less to suppress a variation in angle error, which may be generated in stitching adjoining pieces of profile data due to a measurement error included in profile measurement data corresponding to each one shot, to $1\times10^{-7}$ rad or less; and a zone for evaluating the overlapping areas is optimized. Thus, there is established an optimum correcting method using a Fizeau interferometer, in which performances of the two measuring devices are maximally shown.

A profile measurement was performed by using the measurement system recited in non-patent document 1, and a plane mirror and an elliptical mirror were produced by numerically-controlled PCVM (Plasma chemical vaporization matching), and EEM (Elastic emission matching). The plane mirror was evaluated by using X-rays of 0.06 nm wavelength at 1 km beam line of SPring-8. As a result of the evaluation, it was confirmed that the plane mirror had a sufficiently uniform reflection intensity distribution with respect to reflection X-rays. Also, it was confirmed that the condensing mirror of an elliptical shape had a property of condensing beams of diffraction limit at the same beam line. It was also confirmed that the half bandwidth of the intensity profile on condensing beams that has been designed and measured was 180 nm, and that the profile was substantially equivalent to a profile presumably obtained based on Fresnel-Kirchhoff diffraction integral considering a surface profile.

To obtain condensing beams of a smaller size, it is required to design and fabricate an elliptical mirror having a larger incident angle and a steeper profile, in other words, a larger numerical aperture. There has been designed a condensing mirror of an elliptical shape having a property that the half bandwidth of an intensity profile with respect to condensing beams of diffraction limit is about 30 nm. However, it is impossible to collectively measure the curved surface of the elliptical mirror with a Fizeau interferometer. In performing measurement using the Fizeau interferometer, if the angle defined by a surface of the reference plane and a surface of the measurement object exceeds $1 \times 10^{-4}$ rad, the fringe pattern has a high density, which may make it impossible to acquire surface profile data. The measurement method recited in non-patent document 1 is proposed based on the premise that the entirety of a targeted area of a measurement surface can be collectively measured with the Fizeau interferometer. Accordingly, in the measurement method recited in non-patent document 1, it is impossible to measure the entire surface of a measurement object having such a steep profile that the angle defined by the reference plane of the Fizeau interferometer and the measurement surface exceeds $1 \times 10^{-4}$ rad.

Patent document 1: Japanese Patent No. 3,598,983
Patent document 2: Japanese Patent No. 2,531,596
Patent document 3: Japanese Patent No. 3,562,338

Non-patent document 1: Development of Profile Measurement System Utilizing Interferometer for High-precision X-ray mirror, by Kazuto Yamauchi, Kazuya Yamamura, Hidekazu Mimura, Yasuhisa Sano, Akihisa Kubota, Yasuhiro Sekito, Kazumasa Ueno, Alexei Souvorov, Kenji Tamasaku, Makina Yahashi, Tetsuya Ishikawa, and Yuzo Mori, Journal of Japan Society for Precision Engineering, 69(2003)856.

DISCLOSURE OF THE INVENTION

Technical Problems to be Solved

In view of the aforementioned problems, an object of the present invention is to provide an ultra-precision profile measuring method that enables to measure a plane mirror or a curved mirror analogous to the plane mirror in shape with ultra precision corresponding to nano order or sub-nano order to condense hard X-rays or soft X-rays to be used in a radiation facility, and more particularly to an ultra-precision profile measuring method adapted to measure a measurement object having a steep profile corresponding to a slope exceeding $1 \times 10^{-4}$ rad such as an elliptical portion or a tubular portion with an elongated area in one direction.

Means to Solve the Problems

To solve the above problems, a first invention is directed to an ultra-precision profile measuring method for measuring an overall profile of a measurement object by: acquiring pieces of microscopic measurement data on an area smaller than an area of a curved measurement surface of the measurement object, with an overlapping area being defined between the adjoining pieces of data, with use of a Michelson microscopic interferometer; and performing stitching while optimally correcting a tilt between the adjoining pieces of microscopic measurement data by utilizing a matching degree on the overlapping area of the adjoining pieces of microscopic measurement data, with use of overall profile data obtained with a Fizeau interferometer. The ultra-precision profile measuring method comprises: in the overall profile measurement with the Fizeau interferometer, simultaneously measuring, with the Fizeau interferometer, the curved measurement surface and a reference flat surface whose profile data is known; simultaneously and sequentially tilting the curved measurement surface and the reference flat surface with respect to a reference plane of the Fizeau interferometer to acquire pieces of partial profile data on an area Smaller than the area of the curved measurement surface, with an overlapping area being defined between the adjoining pieces of data; measuring a relative angle between the adjoining pieces of partial profile data as a tilt angle of the reference flat surface; and stitching the adjoining pieces of partial profile data by utilizing a matching degree between the tilt angle and the overlapping area.

In the above arrangement, preferably, the curved measurement surface corresponds to a curved mirror; the reference flat surface corresponds to a plane mirror; the curved mirror and the plane mirror are disposed substantially in parallel to the reference plane of the Fizeau interferometer; the curved mirror is directly disposed on a lower tilt stage; the plane mirror is disposed on an upper tilt stage provided above the lower tilt stage; the curved mirror and the plane mirror are sequentially tilted in a forward direction by manipulating the lower tilt stage to measure a profile of the curved mirror with the Fizeau interferometer; a tilt angle of the plane mirror is measured; merely the plane mirror is tilted in a backward direction by manipulating the upper tilt stage before the tilt angle of the plane mirror with respect to the reference plane reaches a profile measurement limit angle with the Fizeau interferometer to maintain a condition where the profile measurement is executable with the Fizeau interferometer in a succeeding measuring operation.

Preferably, the curved measurement surface corresponds to a curved mirror; the reference flat surface is formed on a part of the curved mirror; the curved mirror with the reference flat surface is disposed on a tilt stage substantially in parallel to the reference plane of the Fizeau interferometer; the curved mirror is sequentially tilted by manipulating the tilt stage to measure a profile of the curved mirror with the Fizeau interferometer; and a tilt angle of the reference flat surface is measured. In the above arrangement, a maximum angle defined by the curved measurement surface of the curved mirror and the reference flat surface is required to be set to a value twice as large as a profile measurement limit angle with the Fizeau interferometer, or less.

In the above arrangement, the size of the curved measurement surface may be larger than the diameter of the reference plane of the Fizeau interferometer. In the modification, the curved measurement surface and the reference flat surface may be sequentially tilted with respect to the reference plane of the Fizeau interferometer for measurement. After the measurement in the field of view of the Fizeau interferometer is terminated, merely the curved measurement surface may be moved in parallel to a direction perpendicular to the optical axis. In the modification, in performing the parallel movement of the curved measurement surface, continuity of the tilt angle of the curved measurement surface can be secured by: maintaining a null-fringe condition of the reference flat surface while monitoring the null-fringe condition of the reference flat surface and the curved measurement surface; and controlling the movement of the curved measurement surface in such a manner that a positional displacement of the curved measurement surface in the null-fringe condition within the field of view of the Fizeau interferometer accurately matches with a feeding distance of the moving stage. For instance, it is possible to perform the parallel movement of the curved measurement surface, while accurately maintaining the angle of the curved measurement surface with respect to the reference plane of the Fizeau interferometer by: defining a second reference flat surface movable relative to the curved measurement surface on an identical moving stage; controlling the posture of the second reference flat surface in such a manner that a null-fringe condition appears within the field of view of the Fizeau interferometer to maintain the posture of the second reference flat surface; and moving the curved measurement surface and the second reference flat surface in parallel to the direction perpendicular to the optical axis while maintaining the null-fringe condition of the second reference flat surface.

The precision on the overall profile obtained by the overall profile measurement with the Fizeau interferometer sufficiently satisfies many purposes of use. Even in the case where the curved measurement surface has such a steep slope that makes it impossible to collectively measure the profile of the curved measurement surface with the Fizeau interferometer, or even in the case where the size of the curved measurement surface is larger than the diameter of the reference plane of the Fizeau interferometer, the surface profile can be measured with high precision corresponding to PV (peak-to-valley) height (sub-nano order) of 1 nm or more in a space wavelength region corresponding to an intermediate/long cycle.

To solve the problems, a second invention is directed to an ultra-precision profile measuring method for measuring an overall profile of a measurement object by: acquiring pieces of microscopic measurement data on an area smaller than an area of a curved measurement surface of the measurement object, with an overlapping area being defined between the adjoining pieces of data, with use of a Michelson microscopic interferometer, while directly or indirectly acquiring a tilt angle of the pieces of microscopic measurement data with a Fizeau interferometer; and stitching the adjoining pieces of microscopic measurement data by utilizing a matching degree between the tilt angle and the overlapping area. The ultra-precision profile measuring method comprises: simultaneously measuring, with the Fizeau interferometer, a plane mirror for posture measurement, which is fixed to the Michelson microscopic interferometer, and a reference flat surface disposed substantially in parallel to the plane mirror and having known profile data to accurately measure relative posture relations between the Fizeau interferometer and the Michelson microscopic interferometer, and a tilt angle of the reference flat surface with respect to a reference plane of the Fizeau interferometer; measuring, with the Michelson microscopic interferometer, the curved measurement surface whose position and angle relative to the reference flat surface are accurately defined; and repeating the measuring operation while simultaneously and sequentially tilting the curved measurement surface and the reference flat surface with respect to the reference plane of the Fizeau interferometer to acquire the pieces of microscopic measurement data, with the tilt angle being obtained in each of the measuring operations.

In the above arrangement, preferably, the curved measurement surface corresponds to a curved mirror; the reference flat surface corresponds to a plane mirror; the curved mirror is directly disposed on a lower rotation stage; the plane mirror is disposed on an upper rotation stage provided above the lower rotation stage; the curved mirror and the plane mirror are sequentially tilted in a forward direction by manipulating the lower rotation stage to measure the tilt angle of the plane mirror with the Fizeau interferometer; the curved mirror is measured with the Michelson microscopic interferometer to acquire the pieces of microscopic measurement data; and merely the plane mirror is tilted in a backward direction by manipulating the upper rotation stage before the tilt angle of the plane mirror with respect to the reference plane reaches a profile measurement limit angle with the Fizeau interferometer to maintain a condition where the tilt angle of the plane mirror is measurable with the Fizeau interferometer in a succeeding measuring operation.

By using a large-sized Fizeau interferometer, if the measurement object is a plane mirror, the posture of the plane mirror can be measured with high precision by setting the reference plane of the Fizeau interferometer as a reference. The present invention proposes, by utilizing the above principle, a method for stitching, with high precision, pieces of partial profile data obtained with the Fizeau interferometer and pieces of microscopic measurement data obtained by a high-resolution Michelson microscopic interferometer by utilizing posture data acquired simultaneously in the above measurements, in measuring an overall profile of the measurement object by stitching the pieces of microscopic measurement data measured with the Michelson microscopic interferometer. The method enables to precisely determine the mirror posture at the time of measurement, while using a flat surface area as a reference, by maintaining relative positional relations between the flat surface area and a measurement area, even if there occurs a change in environmental measurement temperature, a distortion, a deformation, or a posture change with respect to the entirety of the device resulting from shift of the centroid during movement of the stage, or a like factor.

Specifically, the tilt angle of the curved mirror at the time of stitching measurement is determined by disposing a plane mirror on an area contiguous to a curved mirror having a profile whose tilt angle is large, and by simultaneously titling the curved mirror and the plane mirror. In the case where the tilt of the plane mirror is unduly large, the tilt amount of the plane mirror can be detected with the same precision by moving solely the plane mirror, and comparing the tilt angle of the plane mirror before and after the movement of the plane mirror. Thus, profile data can be sequentially acquired while performing posture measurement. Further, a profile with a steeper slope can be measured by combining a high-resolution Michelson microscopic interferometer with a two-dimensional stage.

Effect of the Invention

The ultra-precision profile measuring method of the invention enables to measure a profile of a curved measurement surface having a large area, with profile precision obtained with a Fizeau interferometer and space resolution obtained with a Michelson microscopic interferometer, by combining the Michelson microscopic interferometer having a small measurement area but a high space resolution, and capable of performing high precision profile measurement, with the Fizeau interferometer capable of performing high precision profile measurement in a space wavelength region corresponding to an intermediate/long cycle in such a manner that the performances of the Michelson microscopic interferometer and the Fizeau interferometer are maximally shown. Further, even if the curved measurement surface has a steep slope whose profile cannot be collectively measured with the Fizeau interferometer, the ultra-precision profile measuring method of the invention enables to measure a surface profile of an X-ray mirror with precision corresponding to PV height (sub-nano order) of 1 nm or more in the entirety of the space wavelength region.

BEST MODE FOR CARRYING OUT THE INVENTION

In principle, an ultra-precision profile measuring method of the invention is capable of measuring any profile of a curved surface. Preferably, however, a measurement object to be measured by the inventive ultra-precision profile measuring method is a curved mirror having a curved measurement surface whose curvature radius is larger than 50 to 100 mm. Examples of the curved measurement surface are a cylindrical column surface (tubular surface), an elliptical column surface (elliptical tubular surface), a parabolic cylindrical surface, a hyperbolic cylindrical surface, and an ellipsoidal surface. Primarily, a targeted measurement object is a concave mirror.

In the invention, improvement is made on the performance of a measuring method using a Fizeau interferometer to measure a profile of a steep elliptical column surface having a slope exceeding $1 \times 10^{-4}$ rad. In the improvement, pieces of partial profile data at individual sites are acquired by adjusting the tilt angle of an elliptical mirror with respect to a reference plane of the Fizeau interferometer. The overall profile of the elliptical mirror is obtained by stitching the pieces of partial profile data with high precision. In the stitching, stitching angles are obtained by a method utilizing a tilt angle of the mirror which is measured with high precision at the time of measuring the surface profile, in place of a generally used method of minimizing an error on an overlapping area between pieces of partial profile data. Thus, a measurement system capable of measuring the tilt angle of the mirror with precision of $1 \times 10^{-8}$ rad is configured to measure the stitching angles with high precision.

A Michelson microscopic interferometer A used in the embodiment is New View 100HR of ZYGO Corporation having a maximum measurement area of 5.1 mm × 4.8 mm. A Fizeau interferometer B used in the embodiment is GPI HP-HR of ZYGO Corporation having a maximum measurement area of 200 mm in diameter. Even if the curved measurement surface is an aspherical surface or a tubular surface, as far as the overall profile can be collectively measured, it is possible to measure the profile with high precision corresponding to 1 nm order or less in a space wavelength region corresponding to a long cycle of about 10 mm or more by using the Fizeau interferometer B.

A first invention is based on an ultra-precision profile measuring method for measuring an overall profile of a measurement object by: acquiring pieces of microscopic measurement data on an area smaller than an area of a curved measurement surface of the measurement object, with an overlapping area being defined between the adjoining pieces of data, with use of the Michelson microscopic interferometer A; and performing stitching while optimally correcting a tilt between the adjoining pieces of microscopic measurement data by utilizing a matching degree on the overlapping area of the adjoining pieces of microscopic measurement data, with use of overall profile data obtained with the Fizeau interferometer B.

In the above arrangement, the method for acquiring pieces of microscopic measurement data on an area smaller than an area of the curved measurement surface, with an overlapping area being defined between the adjoining pieces of data, with use of the Michelson microscopic interferometer A is known. The present invention is advantageous in the case where it is impossible to collectively measure an overall profile of a curved measurement surface of a curved mirror having a steeper slope with use of a Fizeau interferometer. Specifically, in the overall profile measurement with the Fizeau interferometer B, the curved measurement surface and a reference flat surface whose profile data is known are simultaneously measured with the Fizeau interferometer, and the curved measurement surface and the reference flat surface are simultaneously and sequentially tilted with respect to the reference plane of the Fizeau interferometer to acquire pieces of partial profile data on an area smaller than the area of the curved measurement surface, with an overlapping area being defined between the adjoining pieces of data. Then, a relative angle between the adjoining pieces of partial profile data is measured as a tilt angle of the reference flat surface, and the adjoining pieces of partial profile data are stitched by utilizing a matching degree between the tilt angle and the overlapping area. Thus, stitching is performed while minimizing an error on the pieces of microscopic measurement data measured with the Michelson microscopic interferometer, by utilizing the overall profile data measured in the above-mentioned manner.

Figure 1:
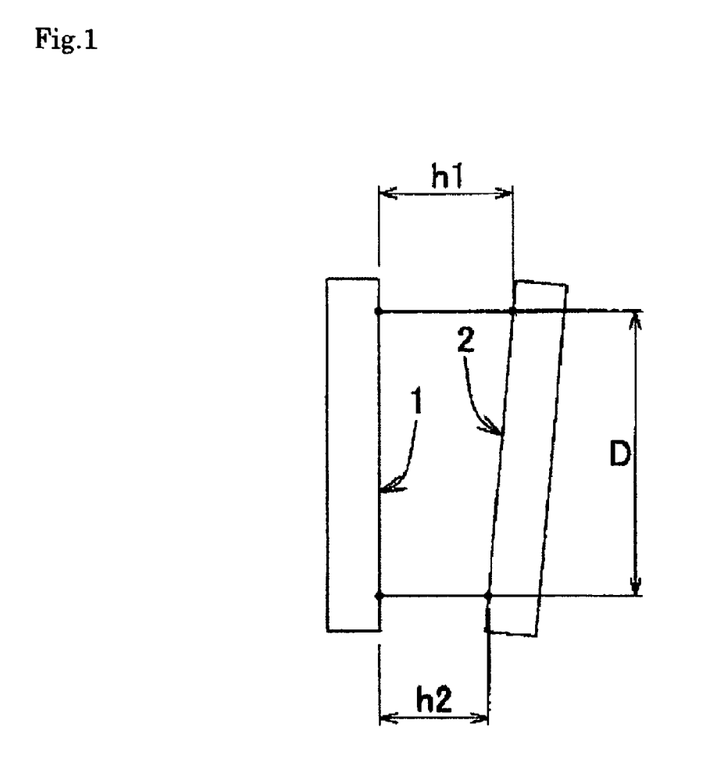
FIG. 1 is a diagram for describing a principle on posture measurement of a plane mirror with a Fizeau interferometer.

In the following, the invention is described in detail based on the embodiment shown in the accompanying drawings. FIG. 1 is a diagram showing a principle on posture measurement of a plane mirror with the Fizeau interferometer B. The Fizeau interferometer B is capable of measuring a profile of a mirror with precision corresponding to 1 nm order, as far as the measurement mirror has a flat surface. More accurately saying, the Fizeau interferometer B is capable of measuring a distance between a plane mirror and a reference plane in the order of 1 nm. The data obtained by the measuring operation is subjected to plane correction, and the data which has undergone the plane correction is displayed as measurement data. The data which has not undergone the plane correction includes information relating to posture relations between the reference plane and the plane mirror. Assuming that measurement precision at individual points is 1 nm order, and the mirror has a curvature radius of 100 mm, as shown in FIG. 1, if $\Delta h = h1 - h2 = 1 \times 10^{-9}$ m, and $D = 1 \times 10^{-1}$ m, the tilt angle defined by a reference plane 1 and a plane mirror 2 can be measured with precision of $\Delta h/D = 1 \times 10^{-8}$ rad. Also, the data can be acquired as plane data because measurement is not conducted merely at two points. Thus, it is possible to measure the angles with high precision and improved reproducibility.

Figure 2:
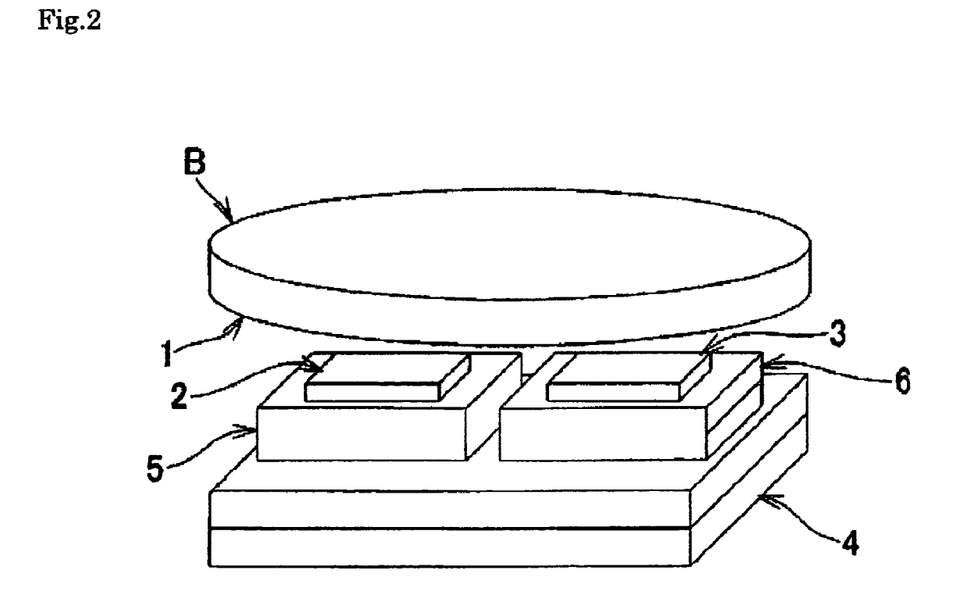
FIG. 2 is a conceptual diagram of an ultra-precision profile measuring device in accordance with an embodiment of a first invention.

An ultra-precision profile measuring device utilizing the above principle is shown in FIG. 2. In the embodiment, there is described a case that measurement is performed with respect to a surface profile of a curved mirror 3 having a quadric surface whose generating line is straight, and a strip-like shape extending along a conductive wire. The curved mirror 3 and the plane mirror 2 are arranged in parallel to the reference plane 1 of the Fizeau interferometer B. The plane mirror 2 and the curved mirror 3 are disposed on a two-stage piezo-driven unit with inclinations of $\theta_\phi$. Specifically, a lower tilt stage 4 has a larger installation area than an upper tilt stage 5, and the upper tilt stage 5 is disposed on a part of the lower tilt stage 4. The curved mirror 3 is disposed on the lower tilt stage 4 via a support table 6 capable of minutely adjusting the posture of the curved mirror 3, and the plane mirror 2 is disposed on the upper tilt stage 5. The plane mirror 2 and the curved mirror 3 have their initial postures set in such a manner that the plane mirror 2 and the curved mirror 3 are allowed to be measured in a null fringe condition with respect to the reference plane 1 of the Fizeau interferometer B.

By manipulating the upper tilt stage 5, merely the plane mirror 2 is allowed to be tilted. Also, by manipulating the lower tilt stage 4, the plane mirror 2 and the curved mirror 3 are allowed to be simultaneously tilted. The curved mirror 3 and the plane mirror 2 are sequentially tilted in a forward direction by manipulating the lower tilt stage 4 to measure the profile of the curved mirror 3 with the Fizeau interferometer B. Subsequently, the tilt angle of the plane mirror 2 is measured, and merely the plane mirror 2 is tilted in a backward direction by manipulating the upper tilt stage 5 before the tilt angle of the plane mirror 2 with respect to the plane mirror 1 reaches a profile measurement limit angle with the Fizeau interferometer B to maintain a condition where the tilt angle of the plane mirror 2 is measurable with the Fizeau interferometer B in a succeeding measuring operation.

Figure 3:
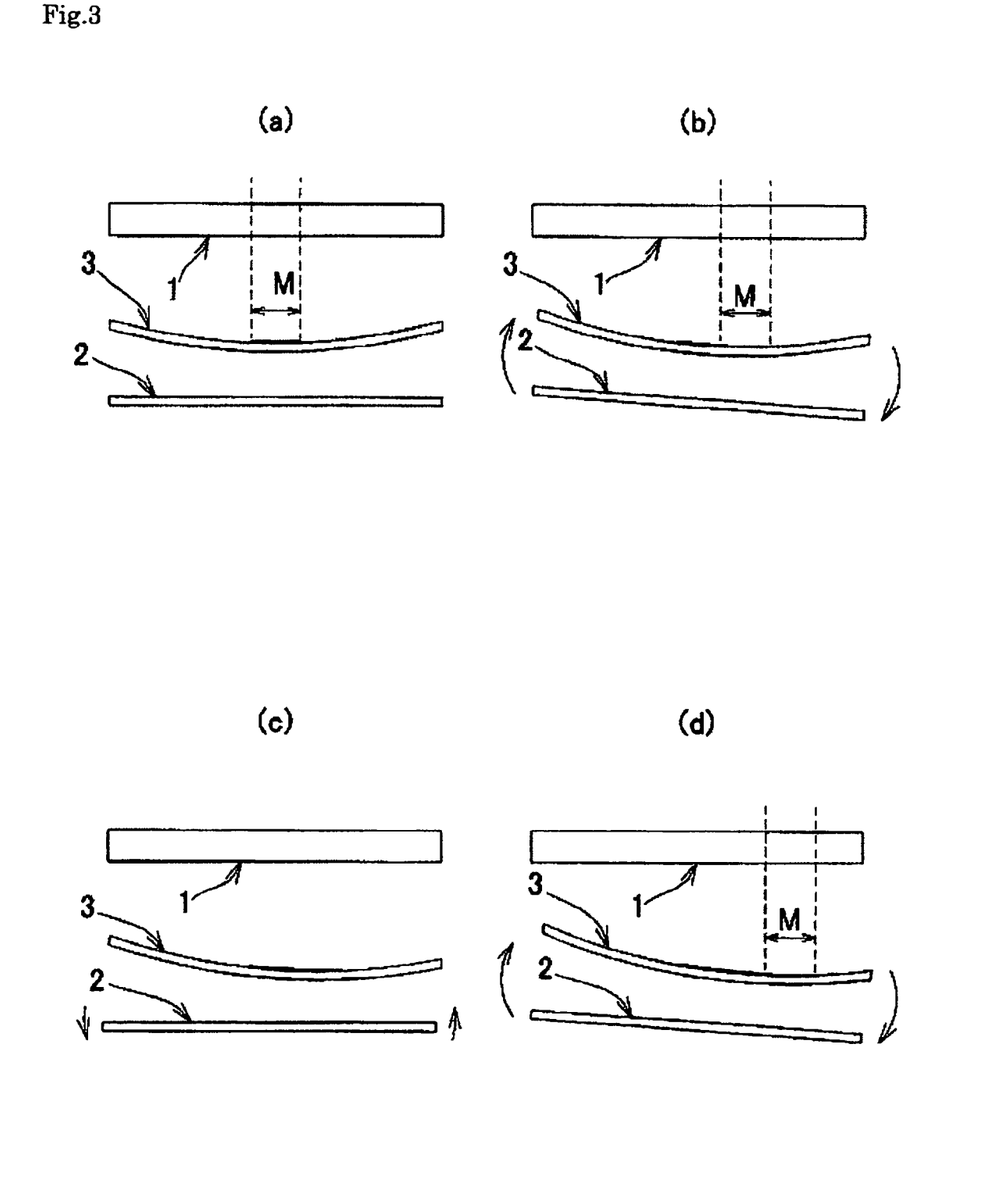

A measurement procedure to be conducted with the Fizeau interferometer B is schematically shown in FIGS. 3(a) through 3(d). The tilts of the plane mirror 2 and the curved mirror 3 are adjusted in such a manner that the entirety of the plane mirror 2, and an area of at least a part of the curved mirror 3 are measurable. Measurement is performed as shown in FIG. 3(a). The area of the curved mirror 3 measurable in individual measuring operations is shown by the symbol M. Profile data on the plane mirror 2, and profile data (partial profile data) on the part of the curved mirror 3 are acquired as measurement data in each of the measuring operations. As shown in FIG. 3(b), the plane mirror 2 and the curved mirror 3 are tilted by manipulating the lower tilt stage 4 to shift a measurement area of the curved mirror 3. In the measuring operation, an overlapping area of a predetermined width is defined between the piece of partial profile data that has been measured, and a piece of partial profile data that is to be measured in a succeeding measuring operation. Then, the succeeding measuring operation is performed. The entire area of the plane mirror 2, and an area on a part of the curved mirror 3 are measured as the measurement data in the succeeding measuring operation. A tilt angle between the consecutive measuring operations can be obtained by comparing the profile data on the plane mirror 2 acquired in the preceding measuring operation without performing plane correction. The above operation is sequentially performed.

If the tilt angle of the plane mirror 2 with respect to the reference plane 1 exceeds a predetermined angle, data acquisition is impossible. In view of this, as shown in FIG. 3(c), the plane mirror 2 is tilted in the backward direction by manipulating the upper tilt stage 5 capable of tilting solely the plane mirror 2. Then, as shown in FIG. 3(d), a measuring operation is performed by simultaneously tilting the plane mirror 2 and the curved mirror 3.

Figure 4:
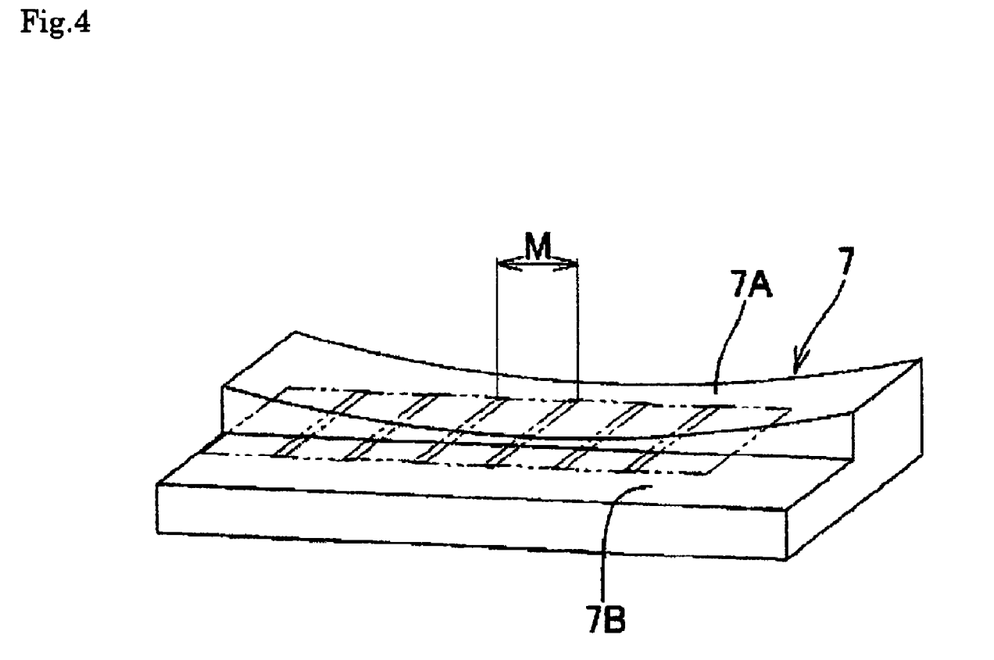
FIG. 4 is a schematic perspective view of a curved mirror with a reference flat surface.

In the foregoing embodiment, the plane mirror 2 and the curved mirror 3 are individual mirrors. Alternatively, in the case where the tilt angle of the elliptical mirror is small, it is possible to dispose a curved mirror 7 including a reference flat surface formed on a part thereof, on a tilt stage (not shown) at a position substantially in parallel to the reference plane of the Fizeau interferometer B; to sequentially tilt the curved mirror 7 by manipulating the tilt stage so as to measure the profile of the curved mirror with the Fizeau interferometer; and to measure the tilt angle of the reference flat surface. In FIG. 4, the reference numeral 7A shows a curved measurement surface, and 7B shows a reference flat surface. In the arrangement of FIG. 4, it is required to set a maximum angle defined by the curved measurement surface 7A of the curved mirror 7 and the reference flat surface 7B to a value twice as large as the profile measurement limit angle with the Fizeau interferometer B, or less.

Figure 5:
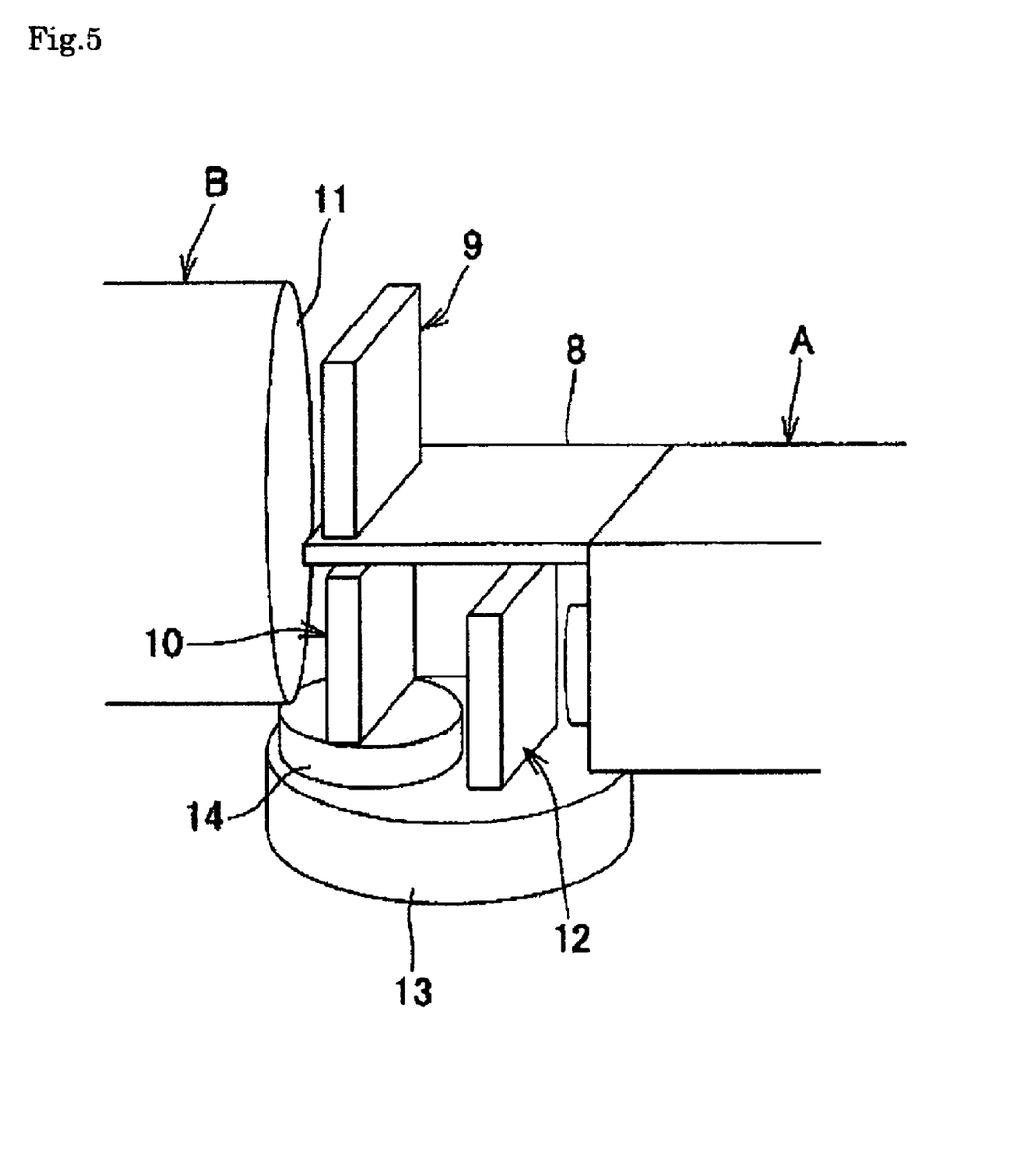
FIG. 5 is a conceptual diagram of an ultra-precision profile measuring device in accordance with. an embodiment of a second invention.

A second invention is based on an ultra-precision profile measuring method for measuring an overall profile of a measurement object by: acquiring pieces of microscopic measurement data on an area smaller than an area of a curved measurement surface of the measurement object, with an overlapping area being defined between the adjoining pieces of data, with use of the Michelson microscopic interferometer A, while directly or indirectly acquiring a tilt angle of the pieces of microscopic measurement data with the Fizeau interferometer B; and stitching the adjoining pieces of microscopic measurement data by utilizing a matching degree between the tilt angle and the overlapping area. As shown in FIG. 5, the method of the invention comprises: simultaneously measuring, with the Fizeau interferometer B, a plane mirror 9 for posture measurement, which is fixed to the Michelson microscopic interferometer A via a fixed plate 8, and a plane mirror 10 disposed substantially in parallel to the plane mirror 9 and having a reference flat surface whose profile data is known to accurately measure relative posture relations between the interferometers A and B, and a tilt angle of the plane mirror 10 with respect to a reference plane 11 of the Fizeau interferometer B; measuring a curved mirror 12 having a curved measurement surface whose position and angle relative to the plane mirror 10 are accurately defined, with the Michelson microscopic interferometer A; and repeating the measuring operation while simultaneously and sequentially tilting the curved mirror 12 and the plane mirror 10 with respect to the reference plane 11 of the Fizeau interferometer B so as to acquire pieces of microscopic measurement data, with the tilt angle being obtained in each of the measuring operations.

Specifically, the curved mirror 12 is directly disposed on a lower rotation stage 13, and the plane mirror 10 is disposed on an upper rotation stage 14 provided above the lower rotation stage 13. Then, the curved mirror surface 12 and the plane mirror 10 are sequentially tilted in a forward direction by manipulating the lower rotation stage 13 to measure the tilt angle of the plane mirror 10 with the Fizeau interferometer B. Then, microscopic measurement data is obtained by measuring the curved mirror 12 with the Michelson microscopic interferometer A. Merely the plane mirror 10 is tilted in a backward direction by manipulating the upper rotation stage 14 before the tilt angle of the plane mirror 10 with respect to the reference plane 11 reaches the profile measurement limit angle with the Fizeau interferometer B to maintain a condition where the tilt angle of the plane mirror 10 is measurable with the Fizeau interferometer B in a succeeding measuring operation.

An ultra-precision profile measuring device shown in FIG. 5 is suitable in measuring a curved surface having a very steep slope. The ultra-precision profile measuring device shown in FIG. 5 enables to measure the overall profile of the curved mirror 12 with high space resolution by: acquiring pieces of microscopic measurement data on the curved mirror 12 at individual tilt angles and postures corresponding to the tilt angles; and stitching the pieces of microscopic measurement data by utilizing the actually measured tilt angles, by combining the Michelson microscopic interferometer A and the Fizeau interferometer B. In the above arrangement, it is necessary to set the posture relations between the Michelson microscopic interferometer A and the Fizeau interferometer B to a fixed state, or to measure the posture relations during measurement of the profile of the curved mirror. As shown in FIG. 5, the posture relations between the Michelson microscopic interferometer A and the Fizeau interferometer B can be measured with precision of $1 \times 10^{-8}$ rad by disposing the plane mirror 9 for posture measurement on the fixed plate 8 connected to the Michelson microscopic interferometer A. Also, in the case where there is a need of moving the curved mirror, a ZX stage may be additionally provided at a lowermost stage of the device. In the modification, a pitching motion, a yawing motion, or a like motion may be generated by driving the ZX stage. However, since an angular displacement resulting from such a motion is included in the tilt angle data on the plane mirror 10, an error resulting from the pitching/yawing motions can be eliminated.

EXAMPLE 1

In the following, results on measuring a profile of a curved mirror, using the ultra-precision profile measuring device shown in FIG. 2 are described referring to FIGS. 6 through 11.

Figure 6:
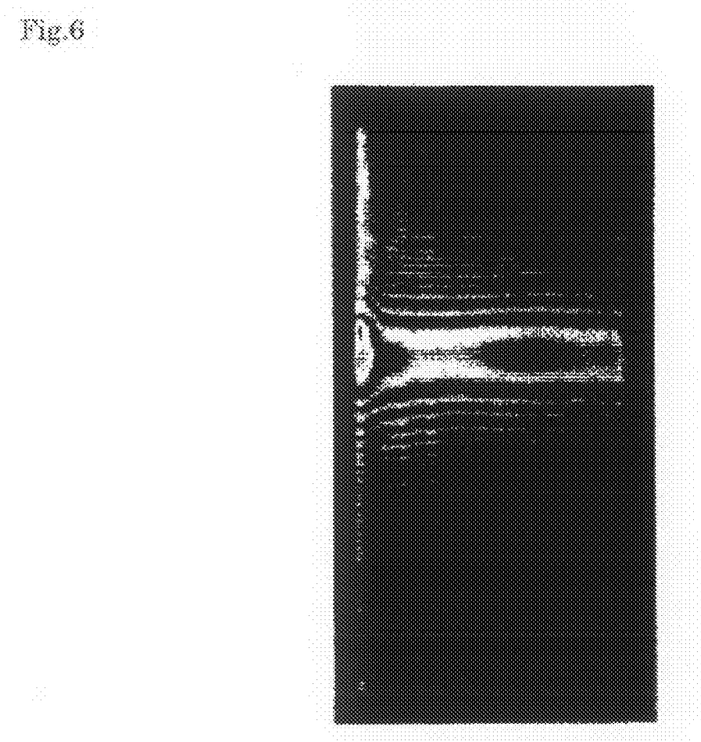
FIG. 6 is a photo showing an interference fringe pattern on a tubular surface mirror measured with the Fizeau interferometer.
Figure 7:
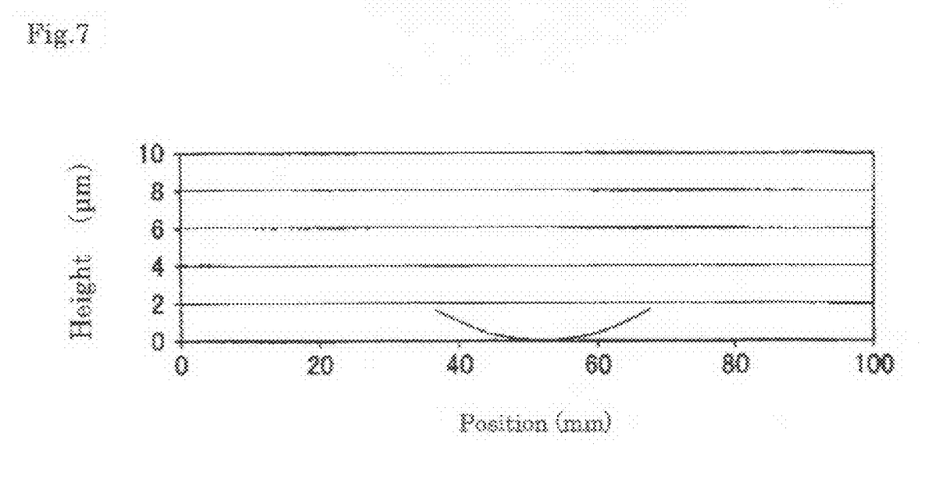
FIG. 7 is a graph showing profile measurement data on the tubular surface mirror measured with the Fizeau interferometer.

FIG. 6 is a photo showing an interference fringe pattern acquired by measuring a tubular surface mirror of about 50 m in curvature radius and 100 mm×50 mm in size with use of a Fizeau interferometer. FIG. 7 is a graph showing partial profile measurement data on the tubular surface mirror. As is obvious from the interference fringe pattern shown in FIG. 6, since both end portions of the interference fringe pattern have fringe intervals of an extremely high density, it is impossible to acquire profile measurement data at the both end portions of the interference fringe pattern. In other words, it is impossible to measure an area exceeding $1 \times 10^{-4}$ rad with respect to the reference plane of the Fizeau interferometer. Accordingly, as shown in FIG. 7, profile measurement data is obtained merely in an angle range including a position corresponding to a null fringe condition as a center.

Figure 8:
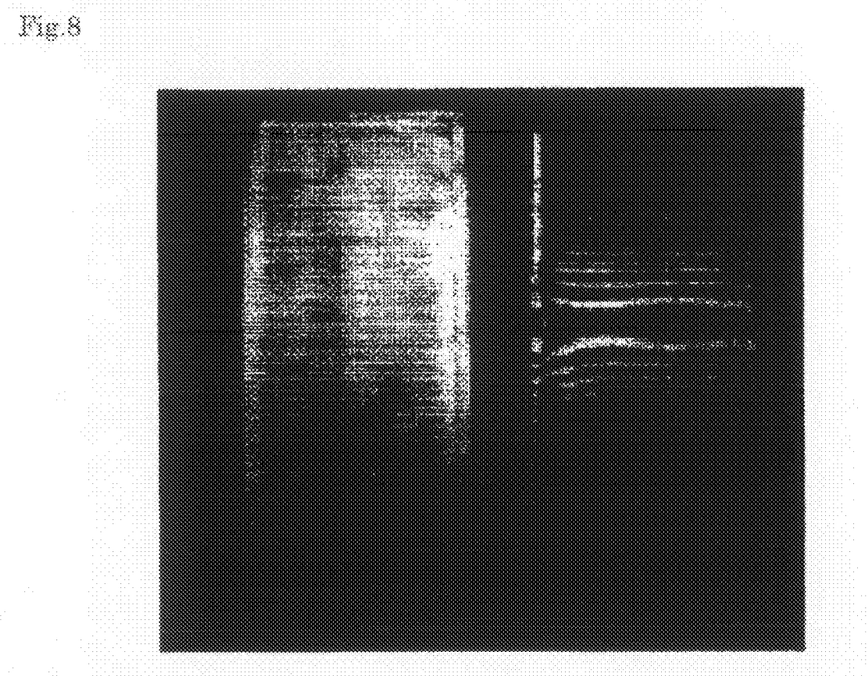
FIG. 8 is a photo showing interference fringe patterns on a tubular surface mirror and a plane mirror disposed in parallel to each other, which are measured with the Fizeau interferometer, specifically, the right-side portion showing the interference fringe pattern on the tubular surface mirror, and the left-side portion showing the interference fringe pattern on the plane mirror.

FIG. 8 is a photo showing interference fringe patterns obtained by performing measurement with use of the ultra-precision profile measuring device shown in FIG. 2 in a state that a tubular surface mirror is disposed on the lower tilt state 4, and a plane mirror of the same size as the tubular surface mirror is disposed on the upper tilt stage 5. The right-side pattern in FIG. 8 is an interference fringe pattern on the tubular surface mirror, and the left-side pattern in FIG. 8 is an interference fringe pattern on the plane mirror. As shown in FIG. 8, it is possible to measure the profile of the plane mirror in a null fringe condition.

Figure 9:
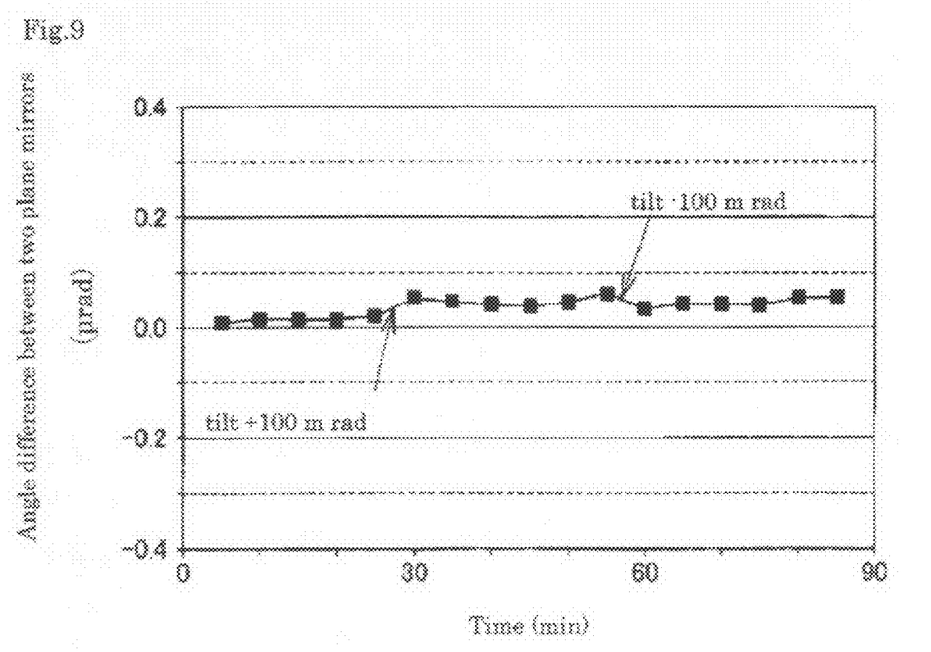
FIG. 9 is a graph showing relations between a difference in tilt angle in a longitudinal direction of a mirror between a plane mirror disposed on a lower tilt stage and a plane mirror disposed on an upper tilt stage, and a lapse of time in the ultra-precision profile measuring device shown in FIG. 2.

FIG. 9 is a graph showing relations between a difference in tilt angle in a longitudinal direction of a mirror between a plane mirror disposed on the lower tilt stage 4 and a plane mirror disposed on the upper tilt stage 5, and a lapse of time. Upon lapse of 30 minutes after the two plane mirrors were disposed on the respective lower and upper tilt stages 4 and 5, the two plane mirrors were tilted by $1 \times 10^{-7}$ rad, and upon lapse of 60 minutes, the two plane mirrors were tilted in the backward direction by the same angle amount. Despite the above operation, the difference in tilt angle was stably maintained at $1 \times 10^{-8}$ rad. The above result shows that a tilt angle of a curved mirror can be measured with precision corresponding to $1 \times 10^{-8}$ rad order by measuring a tilt angle of a plane mirror.

Figure 10:
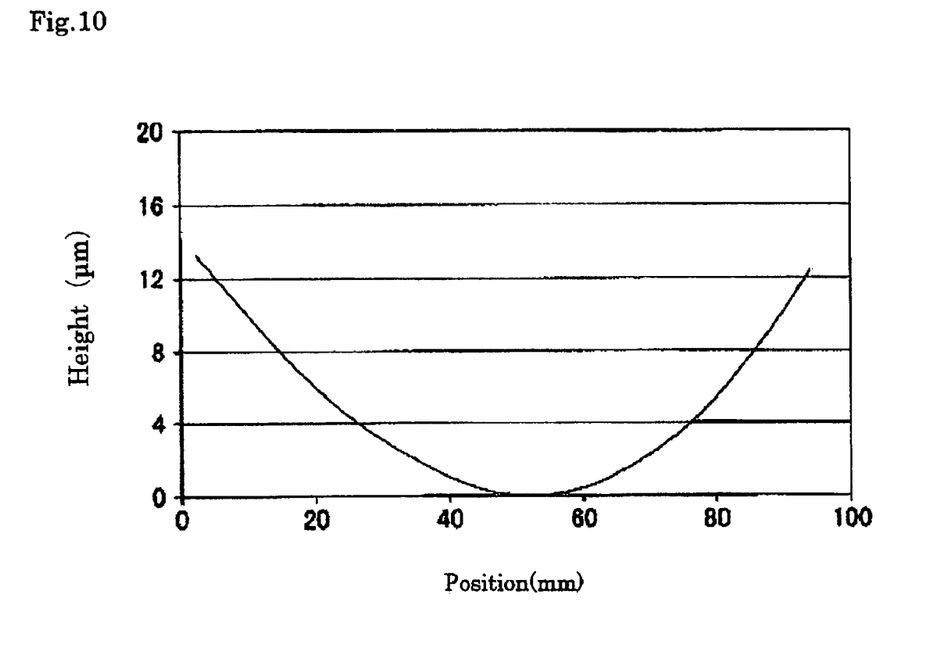
FIG. 10 is a graph showing overall profile data on a tubular surface mirror obtained by stitching pieces of partial profile data with the Fizeau interferometer.
Figure 11:
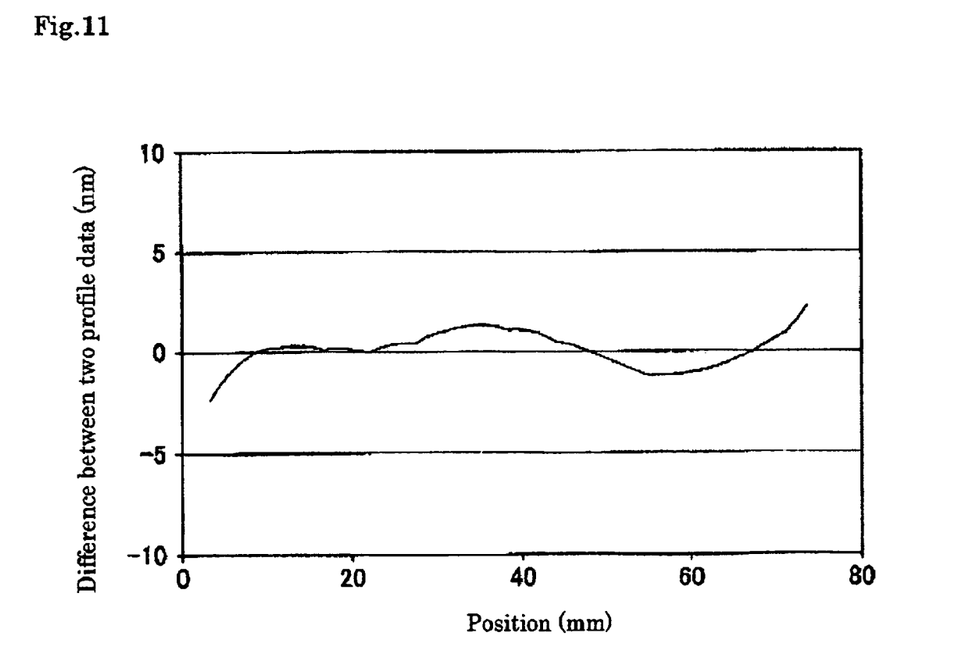
FIG. 11 is a graph showing a profile difference on overall profile data obtained by performing measurements before and after a tubular surface mirror is turned upside down.

FIG. 10 is a graph showing overall profile data on a tubular surface mirror measured by the method shown in FIG. 2. FIG. 11 is a graph showing a profile difference on overall profile data obtained by performing measurements when a tubular surface mirror is turned upside down in the ultra-precision profile measuring device. The experiment result shows that a PV (peak-to-valley) height is 2 nm or less despite inclusion of a measurement error with respect to the entirety of the measurement system.

As described above, overall profile data obtained by stitching pieces of partial profile data with the Fizeau interferometer can be utilized in ordinary high-precision mirror profile measurement. However, precision corresponding to 1 nm (PV) order or more is necessary in the entirety of the space wavelength region of 0.5 mm or more in order to condense X-rays of 0.06 nm (15 keV) wavelength in a wavelength band of 30 nm or less in half bandwidth. In view of the above, profile measurement by combined use of a Fizeau interferometer and a Michelson microscopic interferometer is indispensable to condense the aforementioned hard X-rays in an extreme condition corresponding to diffraction limit.

BRIEF DESCRIPTION OF DRAWINGS

FIGS. 3(*a*) through 3(*d*) are diagrams for describing the measurement principle.

BRIEF DESCRIPTION OF NUMERALS

A: Michelson microscopic interferometer
B: Fizeau interferometer
1: reference plane
2: plane mirror
3: curved mirror
4: lower tilt stage
5: upper tilt stage
6: support table
7: curved mirror
7A: curved measurement surface
7B: reference flat surface
8: fixed plate
9: plane mirror for posture measurement
10: plane mirror
11: reference plane
12: curved mirror
13: lower rotation stage
14: upper rotation stage

The invention claimed is:

1. An ultra-precision profile measuring method for measuring an overall profile of a measurement object by: acquiring pieces of microscopic measurement data on an area smaller than an area of a curved measurement surface of the measurement object, with an overlapping area being defined between the adjoining pieces of data, with use of a Michelson microscopic interferometer; and performing stitching while optimally correcting a tilt between the adjoining pieces of microscopic measurement data by utilizing a matching degree on the overlapping area of the adjoining pieces of microscopic measurement data, with use of overall profile data obtained with a Fizeau interferometer, the ultra-precision profile measuring method comprising:

in the overall profile measurement with the Fizeau interferometer, simultaneously measuring, with the Fizeau interferometer, the curved measurement surface and a reference flat surface whose profile data is known;

simultaneously and sequentially tilting the curved measurement surface and the reference flat surface with respect to a reference plane of the Fizeau interferometer to acquire pieces of partial profile data on an area smaller than the area of the curved measurement surface, with an overlapping area being defined between the adjoining pieces of data;

measuring a relative angle between the adjoining pieces of partial profile data as a tilt angle of the reference flat surface; and stitching the adjoining pieces of partial profile data by utilizing a matching degree between the tilt angle and the overlapping area.

2. The ultra-precision profile measuring method according to claim 1, wherein the curved measurement surface corresponds to a curved mirror;

the reference flat surface corresponds to a plane mirror;

the curved mirror and the plane mirror are disposed substantially in parallel to the reference plane of the Fizeau interferometer;

the curved mirror is directly disposed on a lower tilt stage;

the plane mirror is disposed on an upper tilt stage provided above the lower tilt stage;

the curved mirror and the plane mirror are sequentially tilted in a forward direction by manipulating the lower tilt stage to measure a profile of the curved mirror with the Fizeau interferometer;

a tilt angle of the plane mirror is measured;

merely the plane mirror is tilted in a backward direction by manipulating the upper tilt stage before the tilt angle of the plane mirror with respect to the reference plane reaches a profile measurement limit angle with the Fizeau interferometer to maintain a condition where the profile measurement is executable with the Fizeau interferometer in a succeeding measuring operation.

3. The ultra-precision profile measuring method according to claim 1, wherein the curved measurement surface corresponds to a curved mirror;

the reference flat surface is formed on a part of the curved mirror;

the curved mirror with the reference flat surface is disposed on a tilt stage substantially in parallel to the reference plane of the Fizeau interferometer;

the curved mirror is sequentially tilted by manipulating the tilt stage to measure a profile of the curved mirror with the Fizeau interferometer; and a tilt angle of the reference flat surface is measured.

4. The ultra-precision profile measuring method according to claim 3, wherein a maximum angle defined by the curved measurement surface of the curved mirror and the reference flat surface is set to a value twice as large as a profile measurement limit angle with the Fizeau interferometer, or less.

5. An ultra-precision profile measuring method for measuring an overall profile of a measurement object by: acquiring pieces of microscopic measurement data on an area smaller than an area of a curved measurement surface of the measurement object, with an overlapping area being defined between the adjoining pieces of data, with use of a Michelson microscopic interferometer, while directly or indirectly acquiring a tilt angle of the pieces of microscopic measurement data with a Fizeau interferometer; and stitching the adjoining pieces of microscopic measurement data by utilizing a matching degree between the tilt angle and the overlapping area, the ultra-precision profile measuring method comprising:

simultaneously measuring, with the Fizeau interferometer, a plane mirror for posture measurement, which is fixed to the Michelson microscopic interferometer, and a reference flat surface disposed substantially in parallel to the plane mirror and having known profile data to accurately measure relative posture relations between the Fizeau interferometer and the Michelson microscopic interferometer, and a tilt angle of the reference flat surface with respect to a reference plane of the Fizeau interferometer;

measuring, with the Michelson microscopic interferometer, the curved measurement surface whose position and angle relative to the reference flat surface are accurately defined; and repeating the measuring operation while simultaneously and sequentially tilting the curved measurement surface and the reference flat surface with respect to the reference plane of the Fizeau interferometer to acquire the pieces of microscopic measurement data, with the tilt angle being obtained in each of the measuring operations.

6. The ultra-precision profile measuring method according to claim 5, wherein the curved measurement surface corresponds to a curved mirror;

the reference flat surface corresponds to a plane mirror;

the curved mirror is directly disposed on a lower rotation stage;

the plane mirror is disposed on an upper rotation stage provided above the lower rotation stage;

the curved mirror and the plane mirror are sequentially tilted in a forward direction by manipulating the lower rotation stage to measure the tilt angle of the plane mirror with the Fizeau interferometer;

the curved mirror is measured with the Michelson microscopic interferometer to acquire the pieces of microscopic measurement data; and merely the plane mirror is tilted in a backward direction by manipulating the upper rotation stage before the tilt angle of the plane mirror with respect to the reference plane reaches a profile measurement limit angle with the Fizeau interferometer to maintain a condition where the tilt angle of the plane mirror is measurable with the Fizeau interferometer in a succeeding measuring operation.

* * * * *